(12) United States Patent
Preisner et al.

(10) Patent No.: US 8,439,801 B2
(45) Date of Patent: May 14, 2013

(54) METHOD FOR CONTROLLING AN AUTOMATED SHIFT GEARBOX

(75) Inventors: Marian Preisner, Buehl (DE); Juergen Benz, Oberkirch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 211 days.

(21) Appl. No.: 13/080,355

(22) Filed: Apr. 5, 2011

(65) Prior Publication Data

US 2012/0196722 A1 Aug. 2, 2012

(30) Foreign Application Priority Data

Jan. 27, 2011 (DE) .......................... 10 2011 009 645
Mar. 28, 2011 (DE) .......................... 10 2011 015 328

(51) Int. Cl.
*B60W 10/00* (2006.01)
(52) U.S. Cl.
USPC .......................................................... 477/77
(58) Field of Classification Search .................... 477/34, 477/70, 77, 83, 115
See application file for complete search history.

(56) References Cited

U.S. PATENT DOCUMENTS

| | | | |
|---|---|---|---|
| 2004/0185985 A1* | 9/2004 | Inoue | 477/70 |
| 2006/0122031 A1* | 6/2006 | Preisner et al. | 477/80 |
| 2007/0191184 A1* | 8/2007 | Kuwahara et al. | 477/115 |
| 2011/0306464 A1* | 12/2011 | Holland et al. | 477/77 |

* cited by examiner

*Primary Examiner* — Justin Holmes
(74) *Attorney, Agent, or Firm* — Lucas & Mercanti, LLP

(57) ABSTRACT

A method for controlling a drivetrain in a motor vehicle which has an internal combustion engine with a crankshaft, an automated gearbox with engagable and disengagable gears and a gearbox input shaft and a gearbox output shaft which drives drive wheels, a friction clutch which connects the crankshaft and the gearbox input shaft in a separable manner and is operated in an automated fashion, and a control unit for controlling the drivetrain. For driving comfort, before the vehicle comes to a stop, a starting gear is engaged in an overrun mode such that, after opening the friction clutch, a synchronization of gearbox input and output shaft rotational speed of the starting gear is initiated at a gearbox input shaft rotational speed which is higher than a target rotational speed of the gearbox input shaft yielded by the transmission ratio of the starting gear between the gearbox input and output shaft.

11 Claims, 3 Drawing Sheets

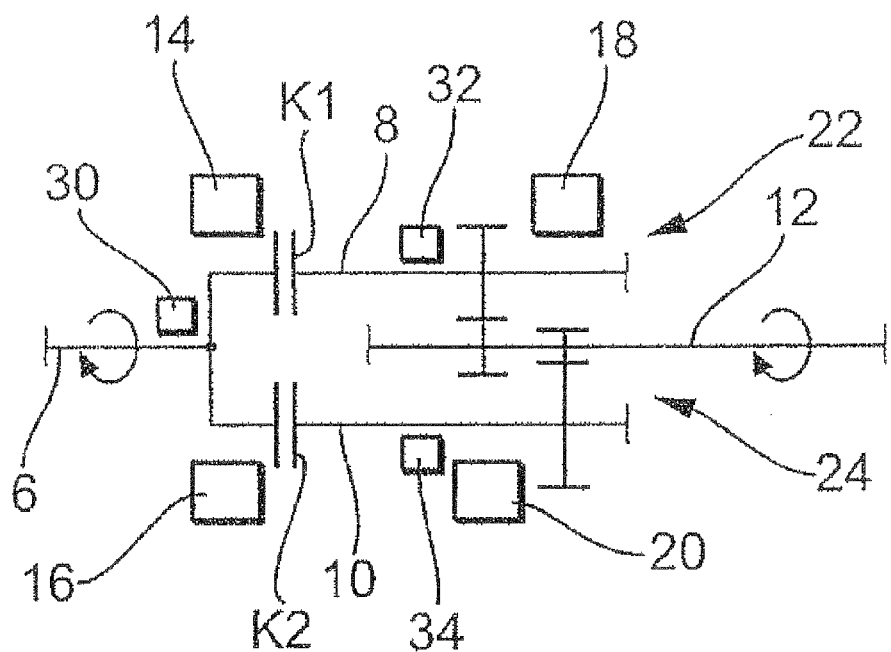
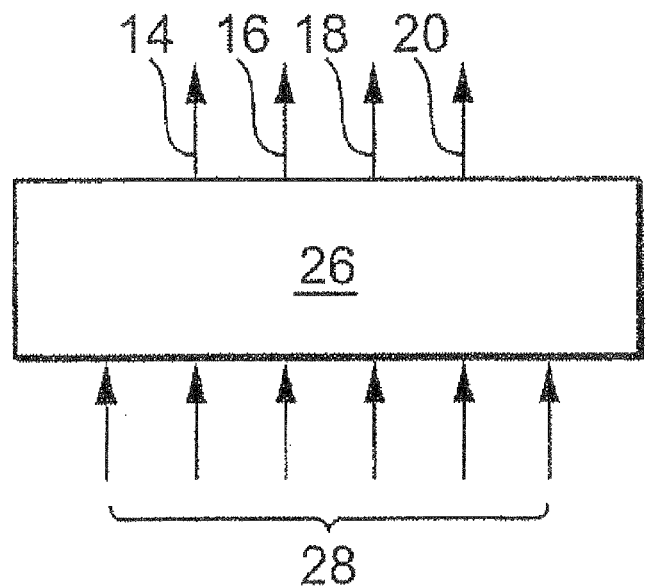
Fig. 1
(Prior Art)

METHOD FOR CONTROLLING AN AUTOMATED SHIFT GEARBOX

This application claims the priority of DE 10 2011 009 645.0 filed Jan. 27, 2011 and DE 10 2011 015 328.4 filed on Mar. 28, 2011, both applications are incorporated by reference herein.

BACKGROUND OF THE INVENTION

In motor vehicles with a drivetrain having an internal combustion engine and, separable by means of a friction clutch, automated gearboxes, for example automated shift gearboxes or double-clutch gearboxes with two component drivetrains—also referred to as component gearboxes—which can be connected to the internal combustion engine by means of, in each case, one friction clutch, a starting gear—for example the first or the second gear—is engaged preferably before coming to a stop in order to be able to quickly drive off again or continue driving. Here, the engagement of a starting gear is often carried out as an overrun downshift, which can result in shift shocks and shift noises which impair driving comfort.

To reduce such an impairment, the downshift may take place at a time at which the motor vehicle has slowed to a considerable degree or is already at a standstill. If, in such a situation, it is sought for example to drive off quickly again (change of mind), the delayed downshift can delay the starting process. Alternatively, the shift itself may be delayed such that the synchronization of the starting gear can be carried out with relatively low synchronization forces and therefore with a relatively minor shift jerk and low noises. This undesirably delays the shift.

Also possible is a method for the synchronization of the starting gear in which the rotational speed of the crankshaft of the internal combustion engine is increased with the friction clutch closed and the shift points are changed. Here, the drivetrain behaves in a way that a driver must become accustomed to, with increasing rotational speed of the internal combustion engine when coming to a stop. Furthermore, fuel consumption is increased. Disadvantages here are the somewhat unusual behavior (engine rotational speed increases when coming to a stop) and the increased fuel consumption.

It is therefore an object of the invention to improve a method for controlling a drivetrain with an automated double-clutch gearbox in particular with regard to a comfortable synchronization of a starting gear before the motor vehicle comes to a stop.

SUMMARY OF THE INVENTION

It should be noted at the outset that the wording "before the motor vehicle comes to a stop" does not mean imperatively that the vehicle actually comes to a stop. The vehicle may coast until it comes to a stop, or the vehicle may drive off again in the starting gear even before coming to a standstill (i.e., before actually stopping) on account of the driving situation or a demand by the driver.

Within the context of this document, the target rotational speed is to be understood to mean the rotational speed calculated from the transmission ratio of the starting gear and the gearbox output rotational speed.

Within the context of this document, an above-target input shaft rotational speed is to be understood to mean the sum of the target rotational speed of the starting gear and an offset value.

The object is thus achieved by means of a method for controlling a drivetrain in a motor vehicle having an internal combustion engine with a crankshaft (6) and having an automated double-clutch gearbox comprising a first and a second automated component gearbox (22, 24) each with engagable and disengagable gears, each component gearbox having a gearbox input shaft (8, 10) and a friction clutch (K1, K2) which connects the crankshaft and the gearbox input shaft in a separable manner and is operated in an automated fashion, and also comprising a gearbox output shaft (12) which drives drive wheels, and having a control unit (26) for controlling the drivetrain, wherein, before the motor vehicle comes to a stop in an overrun mode of the motor vehicle, a shift is carried out from a gear in the second component gearbox into a starting gear in the first component gearbox (that is to say the second component gearbox does not have the starting gear), and the gear in the second component gearbox is a gear stage higher than the starting gear, wherein the starting gear in the first component gearbox is engaged by virtue of the following steps being carried out:

A disengaging a gear engaged in the first component gearbox if a gear is engaged in the first component gearbox, such that no gear is engaged in the first component gearbox, B at least partially closing the friction clutch of the first component gearbox, C opening the friction clutch of the second component gearbox, D bringing the rotational speed of the crankshaft to an above-target input shaft rotational speed by means of the internal combustion engine, E opening the friction clutch of the first component gearbox, F synchronizing the starting gear by synchronizing the gearbox input shaft rotational speed of the first component gearbox with the gearbox output shaft rotational speed by means of a shift actuator.

Here, according to the concept of the invention, it is observed that the shift shocks are less pronounced if the starting gear—for example the first or second gear—is synchronized from "above," that is to say if the gearbox input shaft rotational speed before the synchronization is higher than the synchronized rotational speed of the gearbox input shaft, that is to say the target rotational speed.

In a further preferred embodiment of the invention, it is provided that the steps are carried out in the chronological sequence A, B, C, D, E, F.

In two alternative further preferred embodiments of the invention, it is provided that the steps are carried out in the chronological sequence A, C, B, D, E, F or C, A, B, D, E, F.

In a further preferred embodiment of the invention, it is provided that steps B and C are carried out simultaneously.

In a further alternative preferred embodiment of the invention, it is provided that, in step D, the rotational speed of the crankshaft is not brought to an above-target input shaft rotational speed by means of the internal combustion engine, but rather, in step D, the method waits until the above-target input shaft rotational speed has fallen to the crankshaft rotational speed of the internal combustion engine, and subsequently step E is initiated. Here, the crankshaft rotational speed is usually the idle rotational speed of the internal combustion engine.

In a further preferred embodiment of the invention, it is provided that the starting gear is the first gear and the gear in the second component gearbox is the second gear.

In an alternative further preferred embodiment of the invention, it is provided that the starting gear is the second gear and the gear in the second component gearbox is the third gear.

In a further preferred embodiment of the invention, it is provided that the above-target input shaft rotational speed is yielded by the sum of the target rotational speed of the starting gear, calculated from the transmission ratio of the starting gear and the gearbox output rotational speed, and an offset.

In a further preferred embodiment of the invention, it is provided that the offset is less than 200 revolutions per minute, preferably 50 to 100 revolutions per minute.

The rotational speed increase of the gearbox input shaft of the first component gearbox takes place here in such a way that the drag torques present are overcome until the synchronization is initiated already at a rotational speed of the gearbox input shaft higher than the calculated target rotational speed.

In a further preferred embodiment of the invention, it is provided that step E is carried out when or after the above-target input shaft rotational speed is reached.

In a further preferred embodiment of the invention, it is provided that, in step E, the friction clutch of the first component gearbox is only partially opened.

In a further preferred embodiment of the invention, it is provided that, after step E, or when the above-target input shaft rotational speed is reached, the rotational speed of the crankshaft is reduced again. Fuel can be saved in this way.

In a further preferred embodiment of the invention, it is provided that, during the synchronization of the starting gear, the friction clutch of the second component gearbox remains fully open.

In a further preferred embodiment of the invention, it is provided that, in step E, the friction clutch of the first component gearbox is only partially opened, and that the synchronization takes place with the friction clutch of the first component gearbox at least partially closed, and that, by means of the torque transmitted via said friction clutch, the gearbox input shaft rotational speed of the first component gearbox is kept higher than the above-target input shaft rotational speed until the gearbox input shaft rotational speed is reduced to the target rotational speed by the progressive synchronization.

In a further preferred embodiment of the invention, it is provided that, in step E, the friction clutch of the first component gearbox is only partially opened, and that the synchronization takes place with the friction clutch of the first component gearbox at least partially closed, and that, by means of the torque transmitted via said friction clutch, the gearbox input shaft rotational speed of the first component gearbox is kept at the above-target input shaft rotational speed until the gearbox input shaft rotational speed is reduced to the target rotational speed by the progressive synchronization.

In a further preferred embodiment of the invention, it is provided that, in step E, the friction clutch of the first component gearbox is only partially opened, and that the synchronization takes place with the friction clutch of the first component gearbox at least partially closed, and that, by means of the torque transmitted via said friction clutch, the gearbox input shaft rotational speed of the first component gearbox is kept higher than the target rotational speed until the gearbox input shaft rotational speed is reduced to the target rotational speed by the progressive synchronization.

In a further preferred embodiment of the invention, it is provided that the gearbox input shaft rotational speed of the first component gearbox, after an overshoot by means of regulation of the crankshaft rotational speed, is kept at a constant target rotational speed with the friction clutch of the first component gearbox at least partially closed, and a synchronization is carried out at said constant value until the gearbox input shaft rotational speed is reduced to the target rotational speed by the progressive synchronization.

In a further preferred embodiment of the invention, it is provided that the gearbox input shaft rotational speed of the first component gearbox, after an overshoot by means of regulation of the crankshaft rotational speed, is kept at a constant above-target input shaft rotational speed with the friction clutch of the first component gearbox at least partially closed, and a synchronization is carried out at said constant value until the gearbox input shaft rotational speed is reduced to the target rotational speed by the progressive synchronization.

The object is also achieved by means of a method for controlling a drivetrain in a motor vehicle having an internal combustion engine with a crankshaft and having an automated double-clutch gearbox comprising a first and a second automated component gearbox each with engagable and disengagable gears, each component gearbox having a gearbox input shaft and a friction clutch which connects the crankshaft and the gearbox input shaft in a separable manner and is operated in an automated fashion, and also comprising a gearbox output shaft which drives drive wheels, and having a control unit for controlling the drivetrain, wherein, before the motor vehicle comes to a stop in an overrun mode of the motor vehicle, a shift is carried out from a gear in the second component gearbox into a starting gear in the first component gearbox (that is to say the second component gearbox does not have the starting gear), and the gear in the second component gearbox is a gear stage higher than the starting gear, wherein the starting gear in the first component gearbox is engaged in that, after the opening of the friction clutch of the first component gearbox, a synchronization of gearbox input shaft rotational speed of the first component gearbox and gearbox output shaft rotational speed of the starting gear is initiated at a gearbox input shaft rotational speed of the first component gearbox which is higher by an offset than a target rotational speed of the gearbox input shaft of the first component gearbox yielded by the transmission ratio of the starting gear between the gearbox input shaft of the first component gearbox and the gearbox output shaft, wherein to accelerate the gearbox input shaft of the first component gearbox, the friction clutch of the first component gearbox is at least partially closed, and a crankshaft rotational speed of the internal combustion engine is increased beyond the sum of target rotational speed and offset, and the synchronization is subsequently carried out.

According to the concept of the invention, it is observed that the shift shocks are less pronounced if the starting gear—for example the first or second gear—is synchronized from "above", that is to say if the gearbox input shaft rotational speed before the synchronization is higher than the synchronized rotational speed of the gearbox input shaft, that is to say the target rotational speed.

In a preferred embodiment of the invention, it is provided that, after a gearbox input shaft rotational speed higher than the sum of the target rotational speed and an offset is reached, the friction clutch is opened again.

In a further preferred embodiment of the invention, it is provided that, after the friction clutch is opened, the crankshaft rotational speed is reduced again. Fuel can be saved in this way.

In a further preferred embodiment of the invention, it is provided that the synchronization takes place with the friction clutch at least partially closed and, by means of the torque transmitted via said friction clutch, the gearbox input shaft rotational speed is kept higher than the sum of target rotational speed and offset until the gearbox input shaft rotational speed is reduced to the target rotational speed by the progressive synchronization.

In a further preferred embodiment of the invention, it is provided that the gearbox input shaft rotational speed, after an overshoot by means of regulation of the crankshaft rotational speed, is kept at a constant value, yielded by the sum of target rotational speed and offset, with the friction clutch at least partially closed, and a synchronization is carried out at said constant value until the gearbox input shaft rotational speed is reduced to the target rotational speed by the progressive synchronization.

During the synchronization, a shift sleeve is moved axially for example by a shift actuator, wherein friction devices of a synchronization device provide a braking action such that the rotational speeds of gearbox input shaft and gearbox output shaft, taking into consideration the transmission ratio of the starting gear, converge on one another such that a shift clutch between a loose wheel of the starting gear and the associated shaft can form a positively locking connection. As a function of the rotational speed of the gearbox output shaft resulting from the still-moving motor vehicle, a corresponding rotational speed of the gearbox input shaft is yielded as a target rotational speed. Here, the rotational speeds of the gearbox input shaft, of the gearbox output shaft and of the crankshaft are continuously measured directly or indirectly by sensors and processed by the control unit for controlling the drivetrain, for example an engine control unit which controls the internal combustion engine and a gearbox control unit which is connected thereto via a CAN bus and which controls the automated gearbox and the friction clutches, in order to calculate control variables for the internal combustion engine, the friction clutches and the gearbox.

It is self-evident that the acceleration of the gearbox input shaft to set a rotational speed above the target rotational speed need not imperatively be realized by the internal combustion engine. In fact, in unconventional drivetrains, for example hybrid drivetrains with an electric machine and/or flywheel devices and/or drivetrains with an internal combustion engine switched into a compressionless state, the kinetic energy for accelerating the gearbox input shaft can be provided by an electric machine, a rotating centrifugal mass or a crankshaft which rotates in some other way without combustion.

Further advantages and advantageous refinements of the invention are dealt with in the following figures and the description thereof.

BRIEF DESCRIPTION OF THE DRAWINGS

In the figures, in detail:
FIG. 1 shows a block circuit diagram of a known double-clutch gearbox.

DETAILED DESCRIPTION OF THE INVENTION

Figure 2:
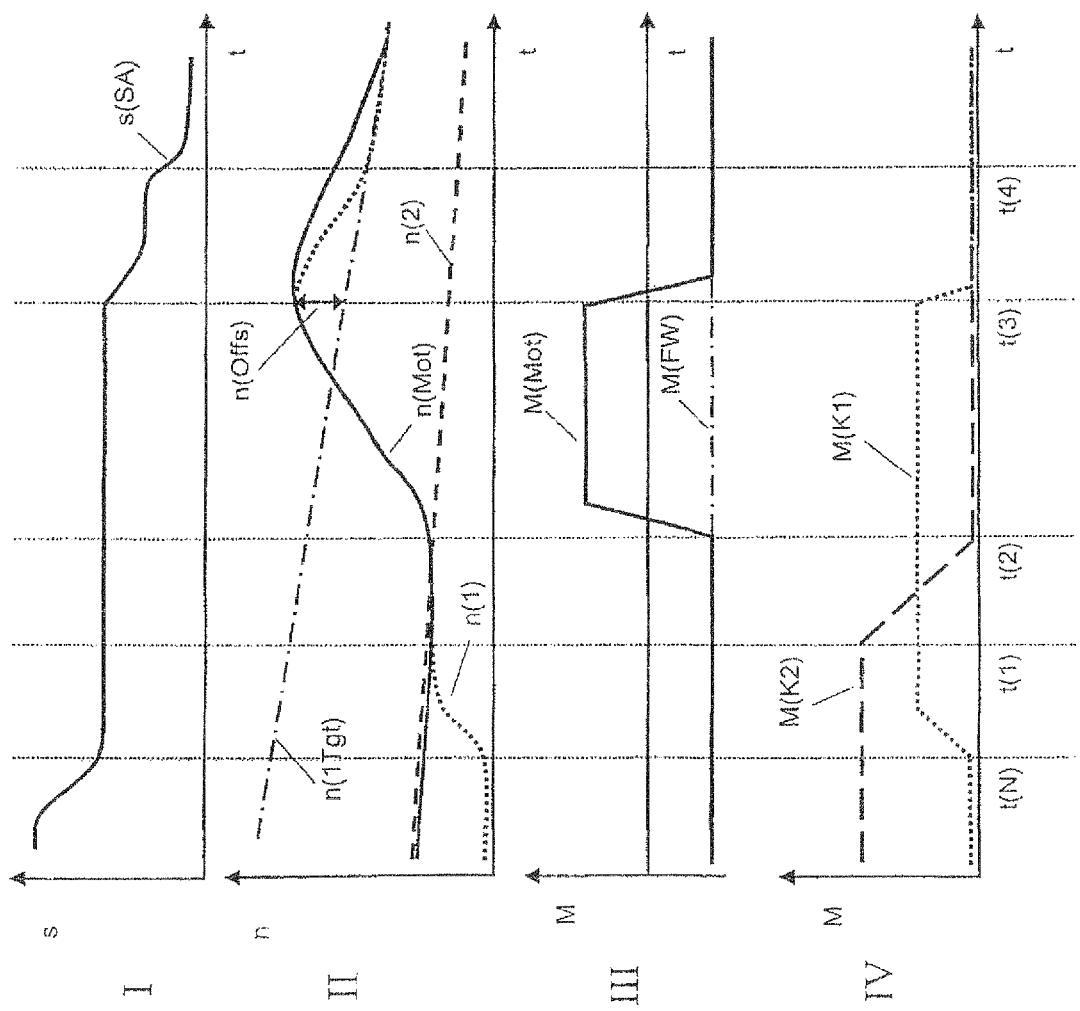
FIG. 2 shows a time diagram for the execution of the method according to the invention.

According to FIG. 1, a double-clutch or parallel-shift gearbox known per se has a drive shaft 6 which is driven for example by an internal combustion engine and which can be connected selectively to two input shafts 8 and 10 for conjoint rotation therewith. The torque flow from the drive shaft 6 into the input shafts 8 and 10 can be selectively controlled by means of in each case one clutch K1 and K2. Different transmission ratios can be engaged between the input shaft 8 and an output shaft 12 by means of wheel pairs, only one of which is illustrated. It is likewise possible for different wheel pairs, only one of which is illustrated, to be engaged between the input shaft 10 and the output shaft 12. To actuate the clutches K1 and K2, actuators 14 and 16 are provided. To engage the wheel pairs, for example to produce a rotationally fixed connection between the wheel arranged on the input shaft 8 or 10 and the respective input shaft 8 or 10, which wheel meshes with a respective wheel permanently connected to the output shaft 12 for conjoint rotation therewith, actuators 18 and 20 are provided which may for example each comprise a shift actuator and a selector actuator. Overall, the input shaft 8 and the output shaft 12 and also the input shaft 10 and the output shaft 12 form in each case one component gearbox 22 and 24 of the double-clutch gearbox.

The actuators 14, 16, 18 and 20 are controlled by an electronic control device 26 with a microprocessor and associated program and data memories, the outputs of which control in each case one of the actuators, and the inputs 28 of which are connected to sensors 30, 32 and 34 which measure the rotational speed of the drive shaft 6, of the input shaft 8 and of the input shaft 10, and also further sensors for measuring operating parameters of the vehicle drivetrain, for example a sensor for measuring the rotational speed of the driven vehicle wheels, a sensor for measuring the position of a gearbox selector lever, a sensor for measuring the position of an accelerator pedal etc. The illustrated control device 26 may be connected via a bus system to further control units of the vehicle, for example an engine control unit by means of which a power controller of the engine is controlled. The actuators may be designed for example as lever-type actuators which are controlled for example by electric motors, wherein the rotation of each electric motor is measured by an incremental counter (not illustrated).

The torque that can be transmitted in each case by a clutch is important for the function of the clutch, and is stored in a memory of the control device 26 as a curve which plots the transmissible clutch torque as a function of the position of a clutch actuator, for example a clutch lever. In the event of a change of the functional state of the clutch as a result of wear and the like, the characteristic curve must be updated, which takes place by means of adaptation processes, for which purpose for example the biting point of the clutch must be checked, and adapted to any occurring changes in the clutch characteristics, during driving operation.

In the double-clutch gearbox illustrated in FIG. 1, a gear can be engaged in each case in the respective component gearbox 22 or 24 whose clutch is open, while the effective transmission ratio of the gearbox is determined by that (active) component gearbox whose clutch is closed. If, for example, a gear is engaged in the component gearbox 22 and the clutch K1 is closed, then said gear is active for the transmission ratio between the drive shaft 6 and the output shaft 12. At the same time, a gear to be newly shifted may be engaged in the other component gearbox 24. During the shift of the gearbox from the presently engaged gear into the newly engaged gear, the clutch K1 must be opened and, for a connection between the drive shaft 6 and the output shaft 12 without an interruption in tractive force, the clutch K2 must be closed in an overlapping manner. When the clutch K2 takes over the transmission of torque, the gearbox would be destroyed as a result of overdetermination of the transmission ratios if at least one of the clutches K1, K2 were not simultaneously slipping. Therefore, a slipping state in which at least one of the two clutches K1, K2 slips is produced at least temporarily when both clutches K1, K2 are simultaneously closed beyond their biting points, wherein the biting point is defined as the point beyond which the clutch transmits torque with progressive closure (at the biting point, a torque of at most a few Newton meters is transmitted).

Within the context of this document, the expressions component gearbox and component drivetrain are used synonymously.

The invention will be explained in more detail on the basis of the following two FIGS. 2 and 3. Said figures show diagrams of different operating variables over time during a shift process for engaging a starting gear before a motor vehicle with a double-clutch gearbox conies to a halt. The shift process described below may be either a 2-1 shift with starting gear 1, that is to say a shift from gear stage 2 to gear stage 1 with gear stage 1 as a starting gear, or a 3-2 shift with starting gear 2, that is to say a shift from gear stage 3 to gear stage 2 with gear stage 2 as a starting gear. Within this document, the expressions gear and gear stage are used synonymously.

FIG. 2 is composed of the subdiagrams I, II, III, IV with a common time axis over time during a shift process of the starting gear. Subdiagram I schematically shows the shift travel s(SA) of the shift actuator, which can shift gears in the component gearbox of the starting gear. Subdiagram II shows the rotational speed n over time t, the solid curve n(Mot) showing the rotational speed of the crankshaft of the internal combustion engine, the dash-dotted curve n(1Tgt) showing the target rotational speed, calculated from the gearbox output shaft rotational speed, for the starting gear, the dotted curve n(1) showing the actual gearbox input shaft rotational speed of the starting gear, and the dashed curve n(2) showing the actual gearbox input rotational speed of the component gearbox which does not have the starting gear, over time t. Subdiagram III is a torque illustration of the torque M over time. Here, the solid curve M(Mot) shows the torque acting at the crankshaft of the internal combustion engine with an increasing torque intervention by the internal combustion engine, and the dash-dotted curve M(FW) shows the torque of the internal combustion engine which would occur without an increasing torque intervention by the internal combustion engine. Subdiagram IV shows a torque illustration of the frictional torque M of the two clutches involved. The dotted curve M(K1) shows the frictional torque of the clutch of the component drivetrain associated with the starting gear, and the dashed curve M(K2) shows the frictional torque of the clutch of the component drivetrain not associated with the starting gear.

From the juxtaposition of subdiagrams I, II, III, IV, the shift process according to the invention for engaging a starting gear before the motor vehicle comes to a stop emerges as follows: if a gear on the shaft of the starting gear is disengaged or is being disengaged—for example the third gear in the case of a 2-1 shift with a starting gear 1—at the time t(N) by means of the shift actuator, the clutch of the component drivetrain associated with the starting gear can be partially closed. This causes the input shaft of the component drivetrain associated with the starting gear to be connected to the internal combustion engine. If, at the time t(1), on account of the driving situation, the gear selection control demands the starting gear with decreasing gearbox output shaft rotational speed, that is to say with decreasing vehicle speed, the clutch of the component drivetrain not associated with the starting gear is opened. At the time t(2), the clutch of the component drivetrain not associated with the starting gear is opened, and the rotational speed of the crankshaft of the internal combustion engine can be moved by means of an increasing torque intervention by the internal combustion engine in the direction of the above-target input shaft rotational speed, determined from the calculated target rotational speed of the starting gear and an additional offset n(Offs). Here, the offset n(Offs) is less than 200 revolutions per minute, preferably in the range from 50 to 100 revolutions per minute, depending for example on the deceleration of the vehicle and/or on the dynamics of the friction clutches and/or of the shift actuator. At the time t(3), said above-target, input shaft rotational speed is reached, the clutch of the component drivetrain associated with the starting gear is opened, and the increasing torque intervention is ended. The shift actuator then begins the synchronization of the remaining rotational speed difference between the gearbox input shaft rotational speed of the starting gear and the calculated target rotational speed for the starting gear, which is completed at the time t(4). Thereafter, corresponding to the driving situation and/or the demand by the driver, the clutch of the component drivetrain associated with the starting gear may remain open in order to allow the vehicle to coast, or may be closed for the purpose of driving off again in the starting gear.

Figure 3:
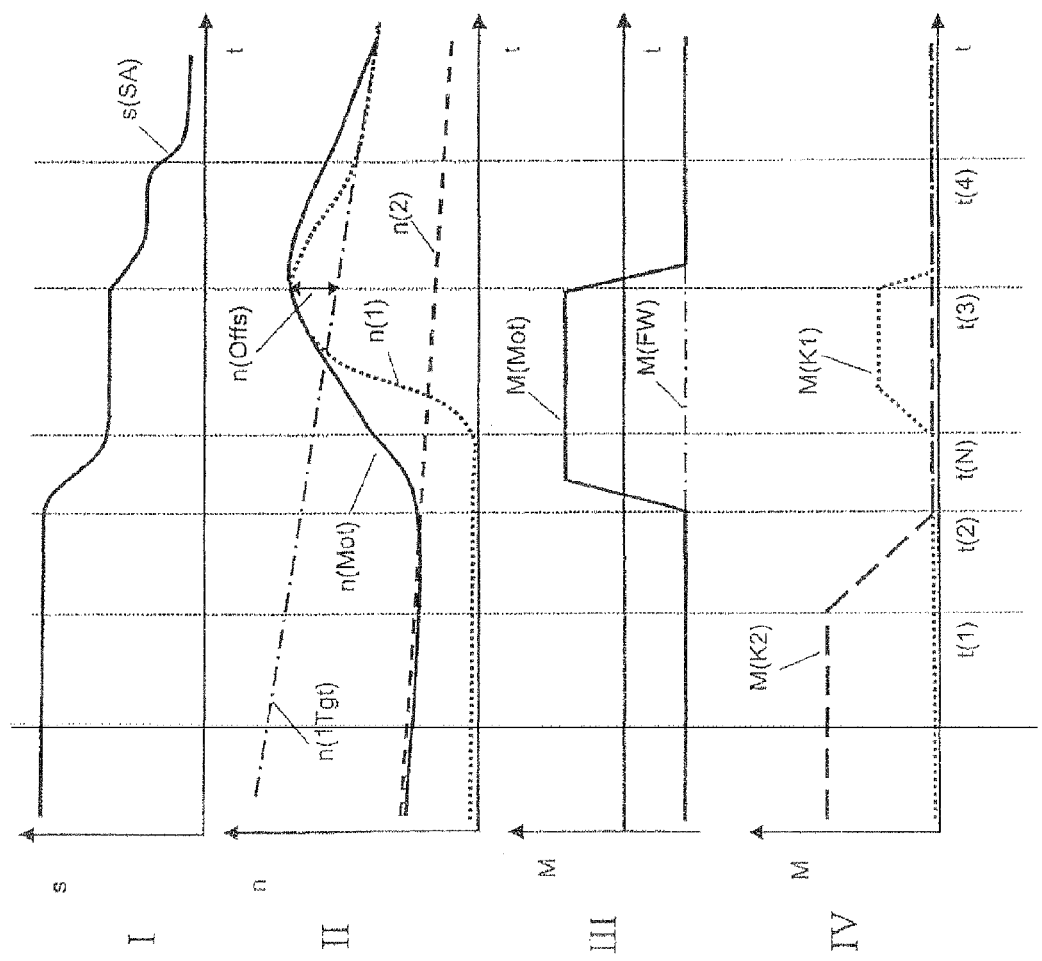
FIG. 3 shows a time diagram for the execution of the method according to the invention.

FIG. 3 shows a similar shift process to that in FIG. 2. Subdiagrams I-IV with a common time axis t show the same signals. Only the time t(N) at which the gear on the shaft of the starting gear is disengaged and subsequently the clutch of the component drivetrain associated with the starting gear is partially closed is shifted to a later time, such that the profile of the curve n(1) is correspondingly changed.

The time t(N) may lie before or after the time t(1), or else may coincide with the time t(1). The time t(N) however always lies before the time t(3).

In general, the shift process may also be carried out without raising the crankshaft by means of an increasing torque intervention by the internal combustion engine. The method then waits, from the time t(2) in FIG. 2 or t(N) in FIG. 3, with the friction clutch of the component drivetrain associated with the starting gear at least partially closed, until, as a result of the deceleration of the vehicle, the above-target input shaft rotational speed has fallen to the crankshaft rotational speed of the internal combustion engine, which is usually the idle rotational speed, in order to reach the time t(3).

LIST OF REFERENCE SYMBOLS

6 Drive Shaft
8 Input Shaft
10 Input Shaft.
12 Output Shaft
14 Actuator
16 Actuator
18 Actuator
20 Actuator
22 Component Gearbox
24 Component Gearbox
26 Control Device
28 Inputs
30 Sensor
32 Sensor
34 Sensor
K1 Clutch
K2 Clutch
n(Offs) Rotational Speed Difference
S(SA) Curve
n(1Tgt) Curve
n(1) Curve
n(2) Curve
n(Mot) Curve
M(Mot) Curve
M(FW) Curve M(K1) Curve
M(K2) Curve
I Subdiagram
II Subdiagram
III Subdiagram
IV Subdiagram
M Torque.
n Rotational Speed
s Shift Travel of Shift Actuator
t Time
t(1) Time
t(2) Time
t(3) Time
t(4) Time
t(N) Time

The invention claimed is:

1. A method for controlling a drivetrain in a motor vehicle comprising an internal combustion engine having a crankshaft, an automated double-clutch gearbox having a first automated component gearbox with engagable and disengagable gears, a first gearbox input shaft, and a first friction clutch, which connects the crankshaft and the first gearbox input shaft in a separate manner and is operated in an automated fashion, a second automated component gearbox with engagable and disengagable gears, a second gearbox input shaft, and a second friction clutch, which connects the crankshaft and the second gearbox input shaft in a separate manner and is operated in an automated fashion, and a gearbox output shaft, which drives drive wheels, and a control unit for controlling the drivetrain, wherein the motor vehicle has an overrun mode and before the motor vehicle comes to a stop in the overrun mode, a shift is carried out from a gear in the second component gearbox into a starting gear in the first component gearbox, and the gear in the second component gearbox being a gear stage higher than the starting gear, and wherein the starting gear in the first component gearbox is engaged by the method comprising following steps:
   (A) disengaging a gear engaged in the first component gearbox if a gear is engaged in the first component gearbox, such that no gear is engaged in the first component gearbox,
   (B) at least partially closing the friction clutch of the first component gearbox;
   (C) opening the friction clutch of the second component gearbox;
   (D) bringing a rotational speed of the crankshaft to an above-target input shaft rotational speed by means of the internal combustion engine;
   (E) opening the friction clutch of the first component gearbox; and
   (F) synchronizing the starting gear by synchronizing the gearbox input shaft rotational speed of the first component gearbox with the gearbox output shaft rotational speed by means of a shift actuator.

2. The method according to claim 1, wherein the steps are carried out in a chronological sequence A, B, C, D, E, F; A, C, B, D, E, F; or C, A, B, D, E, F.

3. The method according to claim 1, wherein steps B and C are carried out simultaneously.

4. The method according to claim 1, wherein step E is not initiated until, in step D, the above-target input shaft rotational speed has fallen to a crankshaft rotational speed of the internal combustion engine.

5. The method according to claim 1, wherein the starting gear is a first gear and the gear in the second component gearbox is a second gear.

6. The method according to claim 1, wherein the starting gear is a second gear and the gear in the second component gearbox is a third gear.

7. The method according to claim 1, wherein the above-target input shaft rotational speed is yielded by a sum of a target rotational speed of the starting gear, calculated from a transmission ratio of the starting gear and the gearbox output shaft rotational speed, and an offset value.

8. The method according to claim 7, wherein the offset value is less than 200 revolutions per minute.

9. The method according to claim 7, wherein the offset value is 50 to 100 revolutions per minute.

10. The method according to claim 1, wherein step E is carried out when or after the above-target input shaft rotational speed is reached.

11. The method according to claim 1, wherein the friction clutch of the first automated component gearbox is only partially opened in Step E.

* * * * *